Aug. 11, 1964   W. DE HAAN   3,144,259
BALL JOINT CONNECTING MEANS FOR WHEEL SUSPENSIONS
Filed Jan. 16, 1962

INVENTOR.
Wolbert DeHaan
BY
W. F. Wagner
ATTORNEY

United States Patent Office 3,144,259
Patented Aug. 11, 1964

3,144,259
BALL JOINT CONNECTING MEANS FOR WHEEL SUSPENSIONS
Wolbert De Haan, Farmington, Mich., assignor to General Motors Corporation, Detroit, Mich., a corporation of Delaware
Filed Jan. 16, 1962, Ser. No. 166,564
1 Claim. (Cl. 280—96.1)

This invention relates to ball joint constructions and more particularly, although not exclusively, to ball joint mounting means for wheel suspension control arms.

An object of the invention is to provide an improved ball joint assembly.

Another object is to provide a ball joint connecting means for two relatively movable parts incorporating improved and simplified means for adjusting and maintaining the spatial relation between the two parts.

A further object is to provide a wheel suspension control arm mounting means wherein a pair of unitized ball joint assemblies are mounted between the control arm and a fixed support on the vehicle in a manner providing a longitudinally directed axis of motion for the control arm, the ball joint assemblies being fixedly secured to the support and adjustably secured to the control arm in a manner whereby rotation thereof produces eccentric displacement of the arm with respect to the support to allow adjustment of caster and camber for the wheel associated with the control arm.

A still further object is to provide a suspension control arm mounting means wherein a fixed support is formed with longitudinally spaced portions having axially aligned apertures formed therein adapted to receive the shank portion of a ball joint assembly, the assembly including a ball portion formed on the shank which is encased in a pair of opposed semispherical bearing shells formed with abutting flanges lying in a plane normal to the major axis of the ball stud, the flanges cooperating to form a circular periphery eccentric to the major axis, which periphery is rotatable in a cup-like depression formed near the inner end of the wheel control arm and retained therein in any selected angular position by releasable locking means associated with the cup-like depression.

These and other objects, advantages and features of the invention will become more fully apparent as reference is had to the accompanying specification and drawing wherein.

Figure 1:
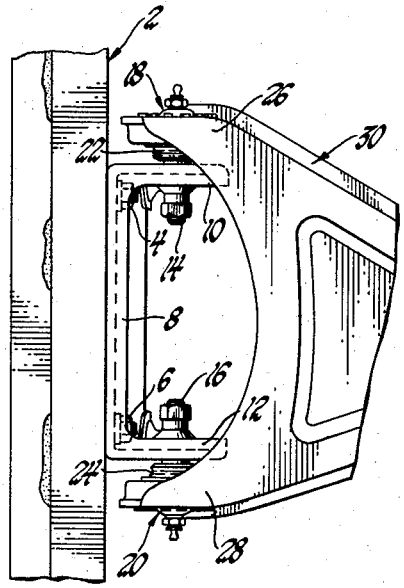
FIG. 1 is a fragmentary top plan view of a portion of an independent wheel suspension illustrating the mounting of the inboard end of a wishbone type upper control arm in accordance with the invention.

Referring now to the drawing and particularly FIG. 1, there is illustrated an upper control arm inboard pivotal mounting means wherein the reference numeral 2 designates generally a vehicle frame side rail, on the outboard side of which is mounted by bolts 4 and 6 a support bracket 8 having longitudinally spaced integral ears 10 and 12. Secured to each ear 10 and 12 is the shank portion 14 and 16 of cartridge type ball joint assemblies 18 and 20, respectively. Assemblies 18 and 20 include generally spherical socket or casing portions 22 and 24 which are disposed in and secured to, in a manner shortly to be described, the bifurcated inboard ends 26 and 28 of a conventional wishbone type upper control arm 30. It will be understood that control arm 30 includes the usual outboard end, not shown, which is articulatably connected to a wheel and support therefor, also not shown. It will be evident that by employing the ball joint connections at each of the inner ends of the control arm, binding and misalignment problems ordinarily encountered with conventional inboard pivot shaft type connections are entirely eliminated.

Figure 2:
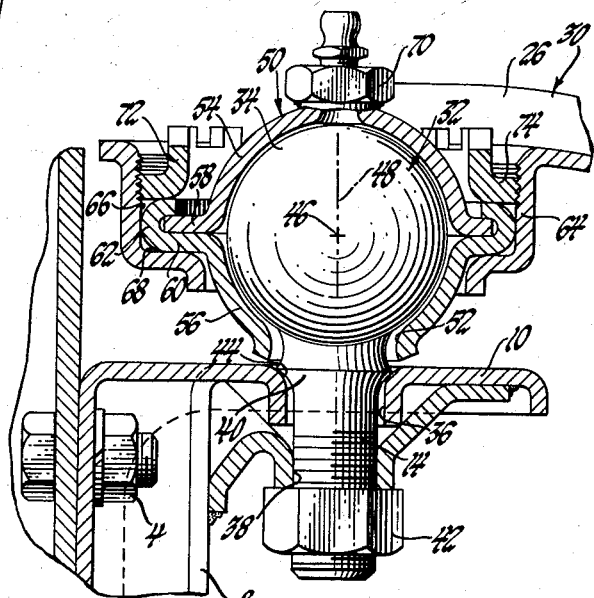
FIG. 2 is an enlarged fragmentary sectional plan view illustrating the details of construction of the arm and associated ball joint at one of the inner ends of the control arm.

According to the principal feature of the invention, each of the ball joint assemblies 18 and 20 are constructed and arranged with reference to the control arm inboard ends so as to permit angular and bodily adjustment of the control arm 30 in the horizontal plane so that the outboard end of the arm may be shifted both fore and aft and laterally inwardly and outwardly to provide the necessary wheel caster and camber adjustment. In FIG. 2, the detailed construction of ball joint assembly 18 is illustrated. It will be understood that assembly 20 is identical except that the parts are arranged in longitudinally opposite relation. Accordingly, the following description of assembly 18 and the associated control arm and support portions applies equally to assembly 20 and associated parts. As seen in FIG. 2, a ball stud element 32 is formed of a ball portion 34 and the previously mentioned shank portion 14. Shank portion 14 is endwise insertable and threadably secured in sleeve apertures 36 and 38 formed in bracket ear 10. Midway of its length, ball stud 32 is formed with a flared shoulder 40 which, upon tightening of nut 42, is drawn into locking engagement with the flared mouth 44 of aperture 36. The geometric center 46 of ball head 34 is colinear with the major axis 48 of shank 14. Surrounding ball portion 34 in bearing engagement therewith is a generally spherical casing 50 having a flared opening 52 formed therein through which shank 14 extends. Opening 52 is sufficiently large to permit of slight rocking motion of the ball stud relative to the casing to accommodate any misalignment which may occur during swingable movement of control arm 30 relative to bracket 8.

In order to connect the casing 50 of assembly 18 to the inner end 26 of control arm 30 and accommodate the necessary adjustment of caster and camber settings, the casing 50 is formed of mating upper and lower semispherical sheet metal shells 54 and 56. Shells 54 and 56 are formed with radially outwardly directed circumferential flanges 58 and 60, respectively, adapted for abutting engagement in a plane normal to the axis 48 of shank 14 and passing through the geometric center 46 of ball head 34. Lower flange 60 is originally greater in diameter than upper flange 58 and the outer periphery of the former is rolled or spun over the outer periphery of the latter to secure the two mating shells in permanent assembled relation. In addition, each of the flanges 58 and 60 are generated in a circle about an imaginary point laterally offset from geometric center 46 so that the perimeter 62 of lower flange 60 describes a circle eccentric to the geometric center 46.

The inner end 26 of arm 30 is formed with a cup-like depression 64 having a cylindrical wall 66 and a lower radially inwardly directed shoulder portion 68 against which flange 60 is seated. Inner circular wall 66 closely interfits the flange perimeter 62. It will be evident that rotation of casing 50 will cause the entire inboard end 26 of arm 30 to move laterally with respect to the geometric center of ball 46. To accommodate rotational adjustment of the casing in cup-like depression 64, the upper extremity of the former is provided with a nut 70 adapted for engagement by conventional socket or end wrenches. After the casing 50 has been rotatably adjusted to the desired position, the flange 60 is rigidly secured against rotational movement in cup-like member 64 by means of an annular locking ring 72, which in the illustrated embodiment is formed with a flared lower end 74 having external threads thereon which engage corresponding internal threads on the cylindrical wall 66 of cup-like depression 64.

Figure 3:
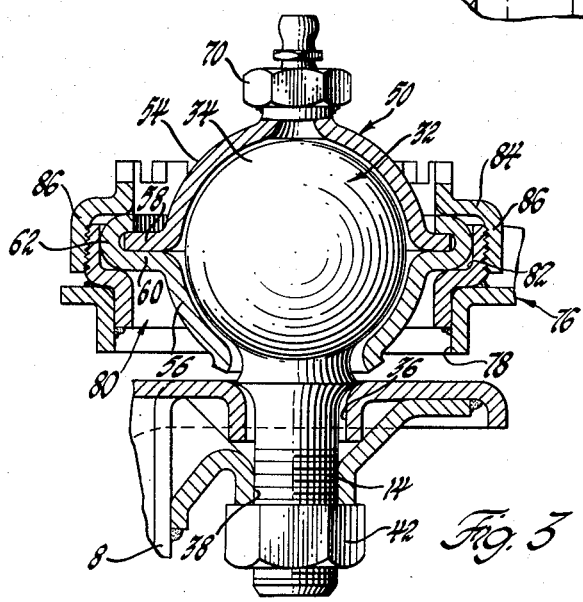
FIG. 3 illustrates a slightly modified version of the construction shown in FIG. 2.

In FIG. 3, there is shown a modification of the invention which permits a simplified construction of the control arm 30. In the embodiment shown in FIG. 3, the control arm 76 is formed with a simple eye 78. A separate stepped cylindrical member 80 is welded in eye 78 to form a cup-like element 82 similar to element 64 in the embodiment shown in FIG. 2. Cylindrical member 80 in this case is provided with external threads adapted for engagement with a locking ring 84 having internal threads along its lower cylindrical wall 86. By constructing the arm 76 in the manner shown in FIG. 3, the necessity of handling a relatively large control arm for threading operations is eliminated. Further, the reversal of the threaded connection protects unengaged threads so that exposure to the elements will not cause accumulations of grit and other foreign matters thereon.

From the foregoing it will be seen that a novel, improved and simplified means for connecting the inboard ends of a wheel control arm has been devised. It is to be particularly noted that the present construction provides maximum accessibility of those parts involved in initial and subsequent adjustment. By contrast, in prior art constructions it has been the conventional practice to generate the ball portion of the ball stud somewhat offset from the axis of the shank and accomplish eccentric adjustment by rotating the stud in the aperatures 34 and 36. However, as will be evident from examination of typical ball joint constructions, the exposed terminal end of the shank portion 14 does not afford any practical means for engagement therewith which would permit such rotational adjustment. In addition, the shank is usually provided with a tapered intermediate portion which establishes non-releasing locking engagement with the associated aperature when assembled. It is, therefore, not only difficult to engage the terminal end of the shank for the proposed adjustment, but in addition it is frequently very difficult to break the locking engagement produced by initial installation. In the present construction, the nut 70 provided for rotating the casing is not only readily accessible, but in addition releasing of the pressure of locking ring 72 completely frees the casing 48 for rotation.

While two embodiments of the invention have been shown and described, it will be apparent that other changes and modifications may be made therein. It is, therefore, to be understood that it is not intended to limit the invention to the embodiments shown, but only by the scope of the claim which follows.

What is claimed is:

In a vehicle suspension, a fixed support having longitudinally spaced portions formed with axially aligned apertures, a wheel control arm having longitudinally spaced inner end portions straddling said fixed support, said inner ends being formed with a shouldered circular opening aligned with said apertures, a ball joint assembly connecting each inner end of said arm to the adjacent longitudinally spaced portion of said support, each of said joints including a colinear ball stud having a shank portion fixedly secured in the adjacent aperture, a casing surrounding the ball portion of said ball stud, a circular flange on said casing nesting in said shouldered opening, said flange being generated eccentric to the axis of said ball stud, means on said casing for rotatably adjusting said casing in said shouldered opening, and means associated with the shouldered portion of said opening for retaining said flange in an adjusted position.

References Cited in the file of this patent

UNITED STATES PATENTS

| | | |
|---|---|---|
| 2,827,303 | Herbenar | Mar. 18, 1958 |
| 2,835,521 | White | May 20, 1958 |
| 2,845,290 | Latzen | July 29, 1958 |
| 2,876,030 | Booth | Mar. 3, 1959 |
| 2,900,196 | Nienke | Aug. 18, 1959 |
| 2,923,555 | Kost et al. | Feb. 2, 1960 |
| 2,924,469 | Moskovitz | Feb. 9, 1960 |
| 2,944,831 | Thomas | July 12, 1960 |
| 3,007,729 | Carlson | Nov. 7, 1961 |